United States Patent
Kim

(10) Patent No.: US 8,898,899 B2
(45) Date of Patent: Dec. 2, 2014

(54) APPARATUS AND METHOD FOR ENCAPSULATING FLUID IN A SHOCK ABSORBER AND A SHOCK ABSORBER MANUFACTURED THEREBY

(75) Inventor: Hark Joo Kim, Jeollabuk-do (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 408 days.

(21) Appl. No.: 13/029,814

(22) Filed: Feb. 17, 2011

(65) Prior Publication Data
US 2011/0198173 A1 Aug. 18, 2011

(30) Foreign Application Priority Data

Feb. 18, 2010 (KR) .................. 10-2010-0014678
Feb. 26, 2010 (KR) .................. 10-2010-0017538

(51) Int. Cl.
*B21D 53/84* (2006.01)

(52) U.S. Cl.
USPC .................. 29/888.3; 188/322.16

(58) Field of Classification Search
CPC ............. F16F 9/36; F16F 9/363; F16F 9/362; F16F 9/43; F16F 9/432; F16F 9/435
USPC ............ 188/322.13–322.5; 29/888.3
See application file for complete search history.

(56) References Cited

U.S. PATENT DOCUMENTS

| 5,598,905 A | 2/1997 | Rudloff |
| 2010/0096229 A1 | 4/2010 | Azekatsu |

FOREIGN PATENT DOCUMENTS

| JP | 2000-074124 A | 3/2000 |
| JP | 2005-042875 | 2/2005 |
| JP | 2005-106111 | 4/2005 |
| JP | 2006275149 A | * 10/2006 |
| JP | 2009-293709 | 12/2009 |
| KR | 2002093227 A | * 12/2002 |
| KR | 10-2008-0110693 A | 12/2008 |
| KR | 880820 B1 | * 1/2009 |

OTHER PUBLICATIONS

Chinese Office Action, w/ English translation thereof, issued in Chinese Patent Application No. CN 201110072214.6 dated Jan. 24, 2013.

* cited by examiner

*Primary Examiner* — Jacob Cigna
(74) *Attorney, Agent, or Firm* — McDermott Will & Emery LLP

(57) ABSTRACT

Disclosed is a fluid encapsulating apparatus and method. The apparatus includes a fluid injection nozzle for injecting gas and oil into a tube of the shock absorber through a fluid injection aperture formed in the tube; a position securing mechanism supporting a seal unit of the shock absorber at a certain position in cooperation with a supporter provided to a piston rod of the shock absorber during oil injection; and a seal securing mechanism sealingly securing the seal unit after injection of the gas and oil. Shock absorbers manufactured thereby are also disclosed.

6 Claims, 6 Drawing Sheets

(a)   (b)

APPARATUS AND METHOD FOR ENCAPSULATING FLUID IN A SHOCK ABSORBER AND A SHOCK ABSORBER MANUFACTURED THEREBY

BACKGROUND

1. Technical Field

The present disclosure relates to an apparatus and method for encapsulating fluid in a shock absorber, and a shock absorber manufactured thereby. More particularly, the present disclosure relates to an apparatus and method for encapsulating gas and oil in a tube of a mono-tube-type shock absorber, and a shock absorber manufactured thereby.

2. Description of the Related Art

In general, a vehicle is provided with shock absorbers between a vehicle frame and an axle to enhance driving comfort by buffering impact or vibration transmitted from the road to the axle during driving. The shock absorber is filled with gas and oil to improve damping force and is sealed.

According to the structure, the shock absorber is classified into a twin tube-type shock absorber, which has a double-wall oil storage tube, and a mono tube-type shock absorber, which has a single wall oil storage tube.

The mono tube-type shock absorber employs a single tube, thereby providing merits of a very simple structure and easy assembly.

FIG. 1 shows one example of the mono tube type shock. The mono tube-type shock absorber 10 includes a single tube 11, a piston rod 12 inserted at one end thereof into the tube 11 and extending at the other end thereof through an upper end of the tube 11, a piston valve 13 provided to the one end of the piston rod 12 to divide the interior of the tube 11 into a rebound chamber 11 *a* at an upper side thereof and a compression chamber 11 *b* at a lower side thereof and having an oil passage formed therein for flow of a working oil between the rebound chamber 11 *a* and the compression chamber 11 *b*, a free piston 14 disposed inside the tube 11 to divide the tube 11 into the compression chamber 11 *b* above the free piston 14 and a gas chamber 11 *c* under the free piston 14, and a seal assembly 15 disposed on the upper end of the tube 11 to seal the upper end of the tube 11 while slidably supporting the piston rod 12.

The seal assembly 15 is composed of a rod guide and an oil seal. Further, the piston rod 12 is engaged at an upper end thereof with an upper fastener, such as an eye bolt 16 or other types of bolt, and with an upper cap 17 directly under the upper eye bolt 16 for installation of a dust cover (not shown).

Within the tube 11, the gas chamber 11*c* under the free piston 14 is filled with gas, and the rebound chamber 11*a* and the compression chamber 11*b* above the free piston 14 is filled with oil.

The tube 11 is generally formed at a lower end thereof with a gas injection hole through which the gas is supplied into the gas chamber 11*c*. Then, with the free piston 14 inserted into the tube 11, the gas is injected into the gas chamber 11*c* through the gas injection hole at the lower end of the tube 11. In this case, the upper end of the tube 11 is closed to prevent the free piston 14 from escaping through the upper end of the tube 11 when a lower space of the tube 11 is filled with the gas, and the gas injection hole is then welded to seal the gas chamber 11*c*.

However, such a conventional gas encapsulating method involves welding of the gas injection hole, which causes generation of sludge during welding and requires cooling of the welded part after welding.

When supplying the oil into the rebound chamber 11*a* and the compression chamber 11*b* above the free piston 14, the piston rod 12 pushes down the free piston 14 to a desired position in the tube 11 to secure an oil storage space in the tube 11 with the gas chamber under the free piston 14 filled with the gas.

The length of the mono-tube-type shock absorber is determined according to the position of the free piston pushed down for supplying the oil. For example, when the piston rod 12 pushes down the free piston 14 to a deep position for supplying the oil as shown in (a) of FIG. 2, an overlapping area between the piston rod 12 and the tube 11 is relatively increased, thereby decreasing the length of the shock absorber. On the contrary, when the piston rod 12 pushes down the free piston 14 to a shallow position as shown in (b) of FIG. 2, an overlapping area between the piston rod 12 and the tube 11 is decreased, thereby increasing the length of the shock absorber.

Meanwhile, the seal assembly 15 fitted into the piston rod 12 is located outside at an upper side of the tube 11 while the oil is supplied into the tube 11, and is then inserted into the tube 11 after the tube 11 is filled with the oil. The seal assembly 15 is inserted into the tube 11 by a seal assembly inserting unit (not shown). Here, in order to descend and insert the seal assembly 15 into the tube 11, the seal assembly inserting unit must be brought into close contact with the piston rod 12 at an upper side of the tube 11.

However, when the piston rod 12 having the eye bolt 16 and the upper cap 17 coupled to the upper end thereof descends a relatively large distance as shown in (a) of FIG. 2, the distance between the upper end of the tube 11 and the upper cap 17 coupled to the upper end of the piston rod 12 decreases, so that a space for operation of the seal assembly inserting unit cannot be obtained.

Conventionally, as shown in (b) of FIG. 2, the piston rod 12 descends a relatively small distance to increase the distance between the upper end of the tube 11 and the upper cap 17 coupled to the upper end of the piston rod 12 in order to secure the space for operation of the seal assembly inserting unit. In this case, there is a problem in that the length of the shock absorber increases as described above.

On the contrary, in the case where the eye bolt 16 and the upper cap 17 are not coupled to the piston rod 12, the seal assembly inserting unit can be brought into close contact with the piston rod 12 even when the piston rod 12 descends a relatively large distance to the position shown in (a) of FIG. 2. In this case, after the oil is supplied to the tube 11 with the piston rod 12 deeply inserted to a position inside the tube 11, as shown in (a) of FIG. 2, the piston rod 12 is fitted into the seal assembly 15, thereby reducing the length of the shock absorber. In this case, however, since it is necessary to secure the piston rod 12 inside the tube 11 in order to couple the eye bolt 16 and the upper cap 17 to the upper end of the piston rod 12, which is not secured inside the tube 11, there is a need for a separate mechanism for securing the piston rod 12, thereby causing a complicated and time-consuming assembly operation.

To solve such problems in the art, the applicant developed an apparatus and method for encapsulating fluid in a shock absorber, as disclosed in Korean Patent No. 0880820. In this apparatus, a free piston is inserted into a tube after a gas is injected into the tube, and oil is injected into the tube after evacuating an upper space above the free piston to a vacuum though a hole formed at a upper side surface of the tube. Then, an oil seal-integrated rod guide is sealingly secured to an upper end of the tube by caulking.

Although the method and apparatus disclosed in Korean Patent No. 0880820 have various merits, for example, elimination of separate painting or tube surface treatment after assembly, the apparatus requires the use of only an oil seal-integrated rod guide and a rod guide separated from an oil seal cannot be used therefor. Moreover, only caulking can be employed to secure the rod guide in a final assembly stage of the shock absorber, and other methods such as curling cannot be used therefor.

BRIEF SUMMARY

The present disclosure is directed to solving above and other problems of the art, and exemplary embodiments provide an apparatus and method for encapsulating fluid in a shock absorber, which can employ not only an oil seal-integrated rod guide but also a rod guide separated from an oil seal by pulling a piston rod upwards to secure the rod guide in order to prevent the rod guide from falling down during evacuation after injection of gas into a tube. Other exemplary embodiments provide shock absorbers manufactured thereby.

In accordance with one aspect, an apparatus for encapsulating fluid in a shock absorber is provided. The apparatus includes a fluid injection nozzle for injecting gas and oil into a tube of the shock absorber through a fluid injection aperture formed in the tube; a position securing mechanism supporting a seal unit of the shock absorber at a certain position in cooperation with a supporter provided to a piston rod of the shock absorber during oil injection; and a seal securing mechanism sealingly securing the seal unit after injection of the gas and oil.

The fluid injection nozzle may be movably provided at one side of the tube to be sealingly inserted into the fluid injection aperture such that any one of a gas supplier, a vacuum pump, and an oil supplier can be selectively connected to the fluid injection nozzle.

The position securing mechanism may secure a position of the seal unit in cooperation with the supporter, with the piston rod pulled upwards, and may move the seal unit upwards or downwards in the tube while clamping the seal unit together with the supporter.

Pulling the piston rod upwards may be achieved by a separate device for pulling the piston rod or by repulsion of the free piston previously inserted into the tube to define a gas chamber before oil injection.

The seal securing mechanism may be used to secure the seal unit to the tube by curling or caulking such that the seal unit can be secured to the tube while closing an upper opening of the tube.

In accordance with another aspect, a shock absorber is provided between a vehicle frame and an axle to absorb impact or vibration transmitted from a road to the axle during driving. The shock absorber is formed with a fluid injection aperture through which a working fluid can be injected into and encapsulated in the shock absorber by the fluid encapsulating apparatus. The fluid injection aperture is open during injection of the fluid by the fluid encapsulating apparatus and is closed by a seal unit when fluid encapsulation by the fluid encapsulating apparatus is completed.

The shock absorber includes a single tube having the fluid injection aperture formed at an upper portion thereof, a piston rod inserted at one end thereof into the tube and extending at the other end thereof through the upper side of the tube, a piston valve provided to a lower end of the piston rod to divide an interior of the tube into a rebound chamber above the piston valve and a compression chamber below the piston valve, a free piston disposed inside the tube to divide the tube into the compression chamber above the free piston and a gas chamber below the free piston, and the seal unit disposed on an upper end of the tube to seal the tube while closing the fluid injection aperture.

In accordance with a further aspect, a method for encapsulating fluid in a shock absorber includes: securing a position of a seal unit by fitting the seal unit into an upper opening of a tube of the shock absorber to seal the upper opening, with the seal unit clamped by a supporter of a piston rod of the shock absorber and a position securing mechanism disposed outside the shock absorber; and filling the tube with a working oil.

The method may further include permanently securing the seal unit after filling the tube with the oil.

The seal unit may be composed of a rod guide and an oil seal separated from each other and permanent securing of the seal unit may be achieved by curling.

The seal unit may be composed of a rod guide and an oil seal integrally formed with each other and permanent securing of the seal unit may be achieved by caulking.

The method may further include, before filling the tube with the oil, preparing the tube which has a fluid injection aperture formed at an upper portion thereof to inject gas and oil into the tube and has a closed lower side; sealing the upper opening of the tube by fitting a free piston into the upper opening; and pushing the free piston into the tube by compressing the piston rod after injecting the gas into the tube through the fluid injection aperture.

The method may further include evacuating an internal space of the tube to be filled with the oil to a vacuum before filling the internal space of tube with the oil.

The seal unit may be inserted into the upper opening of the tube so as not close the fluid injection aperture before the tube is filled with the oil, and may be further inserted into the upper opening of the tube so as to close the fluid injection aperture after the tube is filled with the oil.

In accordance with yet another aspect, a shock absorber is provided between a vehicle frame and an axle to absorb impact or vibration transmitted from a road to the axle during driving. The shock absorber is formed with a fluid injection aperture through which a working fluid can be injected into and encapsulated in the shock absorber by the fluid encapsulating method. The fluid injection aperture is open during injection of the fluid by the fluid encapsulating method and is closed by a seal unit when a fluid encapsulation operation of the fluid encapsulating method is completed.

The shock absorber includes a single tube having the fluid injection aperture formed at an upper portion thereof, a piston rod inserted at one end thereof into the tube and extending at the other end thereof through the upper side of the tube, a piston valve provided to a lower end of the piston rod to divide an interior of the tube into a rebound chamber above the piston valve and a compression chamber below the piston valve, a free piston disposed inside the tube to divide the tube into the compression chamber above the free piston and a gas chamber below the free piston, and the seal unit disposed on an upper end of the tube to seal the tube while closing the fluid injection aperture.

DETAILED DESCRIPTION

Figure 1:
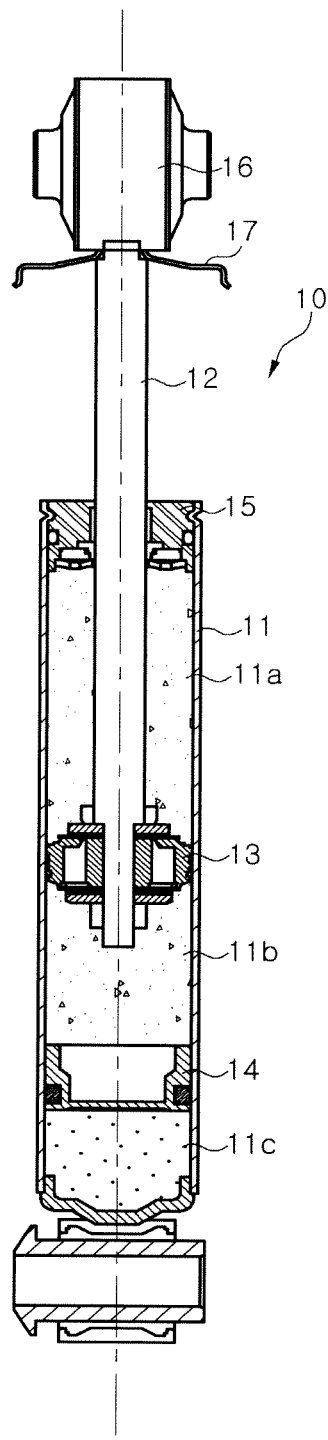
FIG. 1 is a sectional view of a conventional mono tube-type shock absorber.
Figure 2:
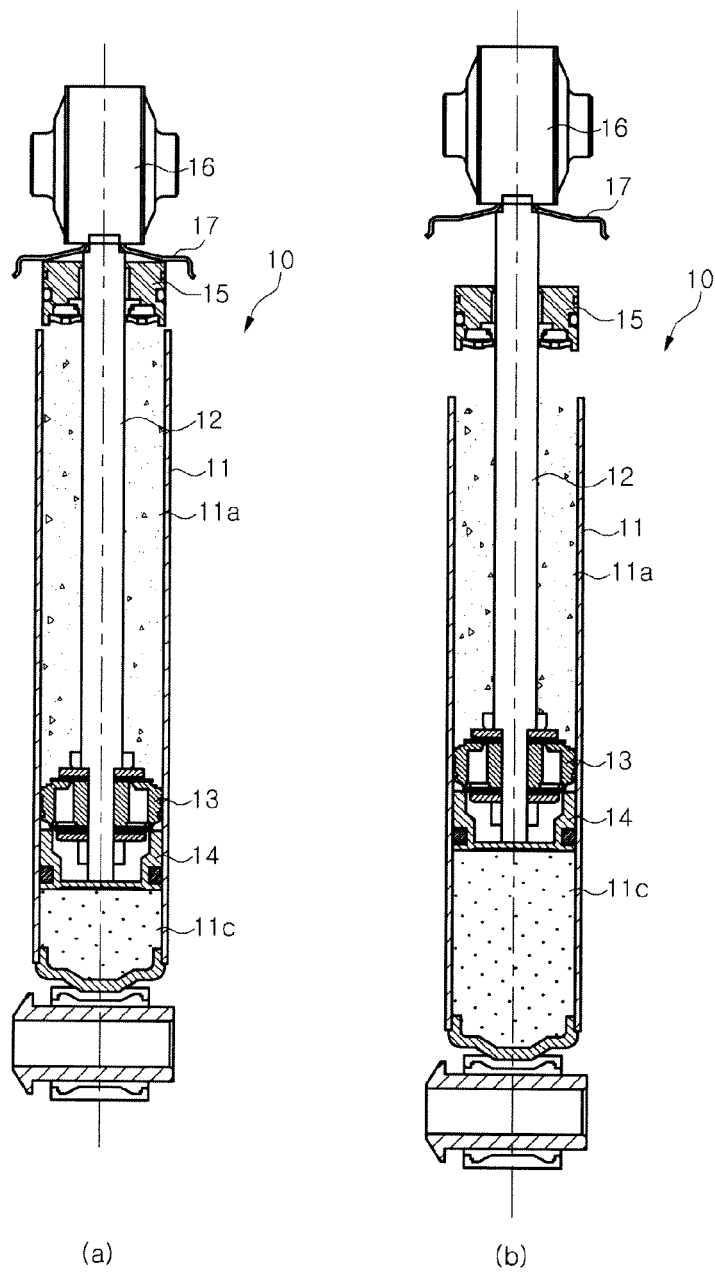
FIG. 2 is a sectional view explaining a fluid encapsulating method for the conventional mono tube-type shock absorber.

Hereinafter, exemplary embodiments of the present disclosure will be described in detail with reference to the accompanying drawings.

Referring to FIGS. 3 to 6, a fluid encapsulating apparatus for a shock absorber according to an embodiment includes a fluid injection nozzle 110 for injecting fluid such as a gas and a working oil into a tube 11 of the shock absorber; a position securing mechanism 120 supporting a seal unit 20 composed of a rod guide 21 and an oil seal 22 at a certain position in cooperation with a supporter such as a stopper 12a provided to a piston rod 12 during oil injection, and a seal securing mechanism 130 sealingly securing the seal unit 20 after injection of the gas and oil.

The fluid encapsulating apparatus and method according to the embodiment may be applied to any mono tube-type shock absorber including the conventional shock absorber described in the background, and the same components as those of the conventional shock absorber will be denoted by the same reference numerals.

In this embodiment, the tube 11 of the shock absorber is formed with a fluid injection aperture 11d. The fluid injection aperture 11d is located near an upper end of the tube 11. More specifically, the fluid injection aperture 11d may be formed at a position of the tube 11 which allows the upper end of the tube 11 to be closed by the free piston 14 or the rod guide 21 while allowing the fluid injection aperture 11d to be opened during injection of the gas or oil into the tube 11.

The fluid injection nozzle 110 may be disposed to move from one side of the tube to the right or left, and may be sealingly inserted into the fluid injection aperture 11d formed in the tube 11. A hydraulic cylinder 111 may be connected to the fluid injection nozzle 110 to move the fluid injection nozzle 110 laterally, as needed.

The fluid injection nozzle 110 may be selectively connected to a gas supplier, a vacuum pump, and an oil supplier. The gas supplier may include a gas storage tank and a compressor. The oil supplier may include an oil storage tank and a compressor. The gas supplier, vacuum pump and oil supplier are well known in the art and detailed description thereof will thus be omitted herein.

Figure 4:
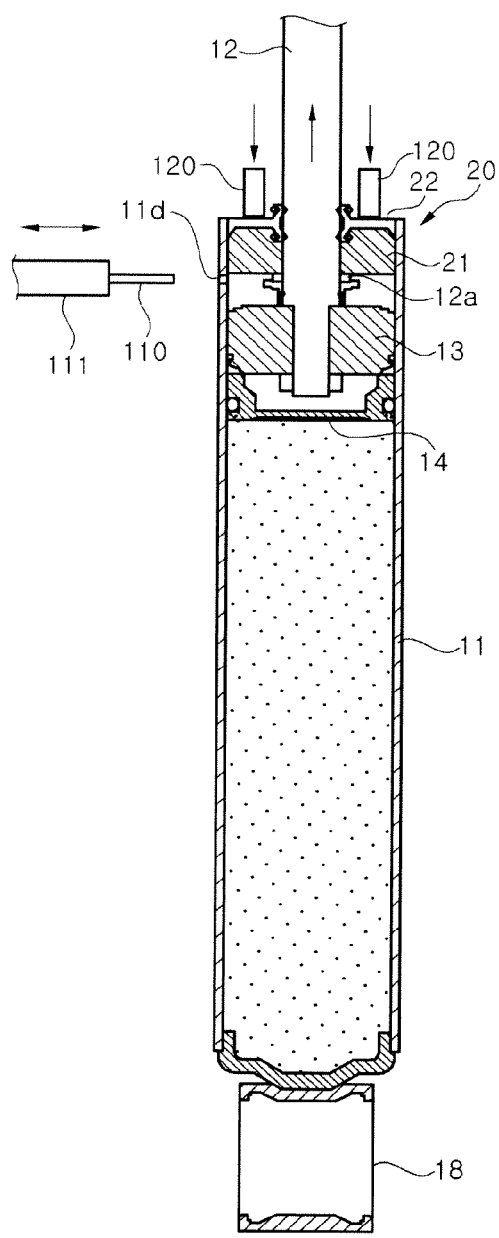
Figure 5:
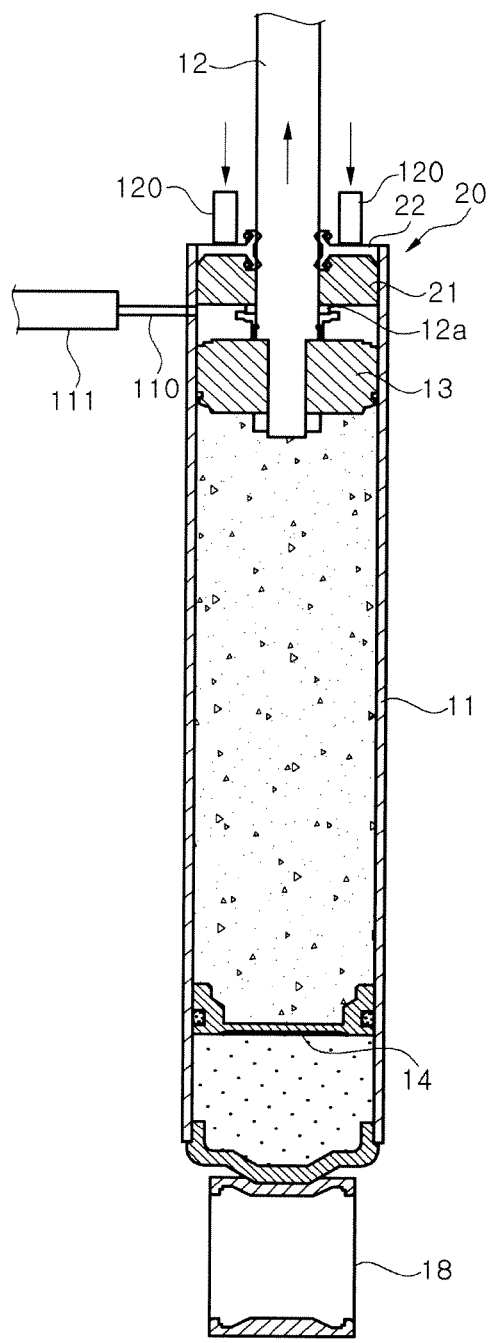

The position securing mechanism 120 is used when evacuating an upper space of the free piston 14 of the tube 11 and injecting the oil into the tube 11 after completing gas injection and insertion of the free piston 14 into the tube 11. As shown in FIGS. 4 and 5, the position securing mechanism 120 supports the seal unit 20 composed of the rod guide 21 and the oil seal 22 at a certain position in cooperation with the supporter such as the stopper 12a provided to the piston rod 12. Both the rod guide and the oil seal are vertically clamped together by the supporter and the position securing mechanism so that the rod guide and the oil seal are interposed, and during vertically clamping both the rod guide and the oil seal, the supporter comes into contact with a lower surface of the rod guide to press the rod guide upwardly and the position securing mechanism comes into contact with an upper surface of the oil seal to press the oil seal downwardly.

When the piston rod 12 is not provided with the stopper 12a, a washer disposed on an upper end of the piston valve 13 may be used as the supporter. According to the embodiment, since the position securing mechanism 120 maintains the seal unit 20 at a certain position on the upper end of the tube 11 in cooperation with the supporter such as the stopper 12a, the rod guide 21 of the seal unit 20 is prevented from being suctioned into the tube 11 when the interior of the tube 11 is evacuated to a vacuum.

In order to allow the supporter to cooperate with the position securing mechanism 120, evacuation and oil injection are performed with the piston rod 12 pulled upwards. Any component can be used as the position securing mechanism 120 so long as the component can secure the position of the seal unit 20 in cooperation with the supporter with the piston rod 12 pulled upwards, and can move the seal unit 20 upwards or downwards while clamping the seal unit 20 together with the supporter as needed. For this purpose, the position securing mechanism 120 may include a drive device such as a cylinder or an actuator.

In FIGS. 4 and 5, two position securing mechanisms 120 are illustrated as contacting the upper end of the oil seal 22 at the right and left, but the number and shape of position securing mechanisms 120 do not limit the present disclosure.

When injection of gas and oil into the tube 11 is completed, the seal unit 20 is moved down by the position securing mechanism 120 and the supporter to close the fluid injection aperture 11d which is formed near the upper end of the tube 11 for injection of the gas and oil. To sealingly secure the seal unit 20 in this state, the seal securing mechanism 130 is used.

The seal securing mechanism 130 sealingly secure the seal unit 20 such that the seal unit 20 can close the upper end of the tube 11 by caulking, curling or the like. The seal securing mechanism 130 may be moved by a hydraulic cylinder.

According to one embodiment, the shock absorber may be filled with gas and oil and sealed through the following process using the fluid encapsulating apparatus as described above.

In this embodiment, a lower eye bolt 18 may be provided to a lower end of the tube 11 before supplying gas and oil into the tube 11 of the shock absorber 10. Further, the tube 11 is formed at a side surface of an upper end thereof with a fluid injection aperture 11d. In the drawings, a bolt is provided to the upper end of the piston rod 12. According to the specification of the shock absorber, an upper eye 16 and an upper cap 17 may be previously coupled to the upper end of the piston rod 12.

As described above, the fluid injection aperture 11d is formed near the upper end of the tube 11. More specifically, the fluid injection aperture 11d may be formed at a position of the tube 11 which allows the upper end of the tube 11 to be closed by the free piston 14 or the rod guide 21 while allowing the fluid injection aperture 11d to be opened during injection of the gas or oil into the tube 11

Figure 3:
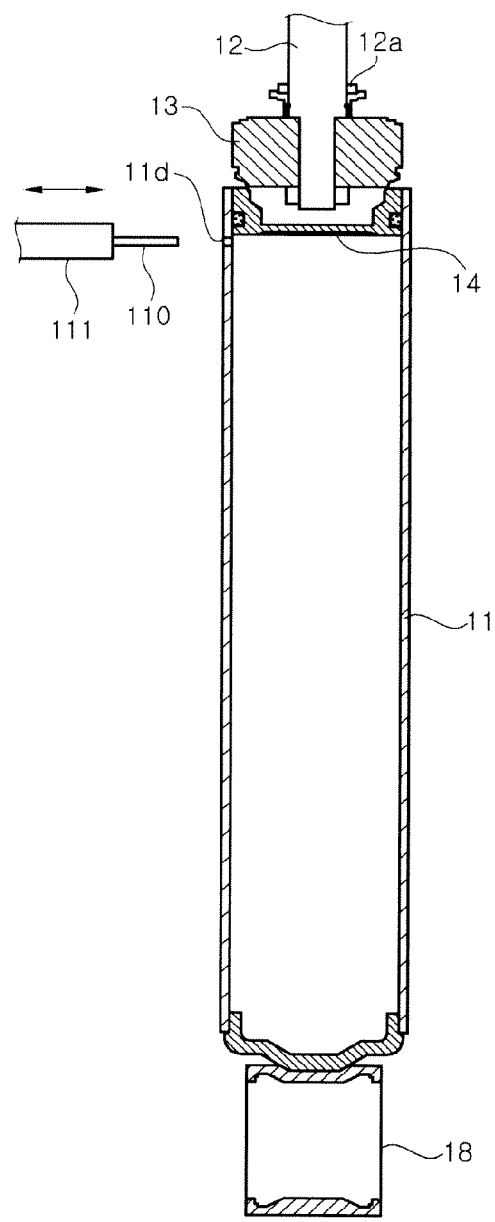
FIGS. 3 to 6 are sectional views of an apparatus and method for encapsulating fluid in a shock absorber in accordance with embodiments of the present disclosure.

First, as shown in FIG. 3, the free piston 14 is fitted into the upper opening of the tube 11 to seal the upper opening. Here, in order to prevent a side surface of the free piston 14 from closing the fluid injection aperture 11d, the position of the free piston 14 may be temporarily secured with the free piston 14 fitted into the upper end of the tube 11 such that an upper portion of the free piston 14 can be slightly protruded from the upper end of the tube 11. Since an apparatus for fitting and temporarily securing the free piston 12 with respect to the tube 11 before the tube is filled with gas is well known in the art, a detailed description thereof will be omitted herein.

Next, the fluid injection nozzle 110 is sealingly inserted into the fluid injection aperture 11d to inject an inert gas into the tube 11 through the fluid injection aperture 11d.

Then, as shown in FIG. 4, the piston rod 12 is compressed to push down the free piston 14 from the upper end of the tube 11 into the tube 11. Here, the seal unit 20, that is, the rod guide 21 and the oil seal 22, is clamped by the supporter such as the stopper 12a and the position securing mechanism 120 above the piston valve 13.

In this embodiment, the piston rod 12 is pulled upwards in order to clamp the seal unit 20 using the supporter and the position securing mechanism 120. This operation can be achieved using a separate actuator or repulsion of the free piston 14.

According to the embodiment, since the piston rod 12 can be intentionally pulled upwards to allow the seal unit 20 to be fitted and temporarily secured in between the supporter and the position securing mechanism 120, the fluid encapsulating method according to the present disclosure may be applied to both a seal unit composed of a single component such as an oil seal-integrated rod guide and a seal unit composed of separate components, that is, the rod guide 21 and the oil seal 22 separated from each other. As a result, the shock absorber may employ a relatively inexpensive two-piece type seal unit composed of the rod guide and the oil seal separated from each other, instead of a relatively expensive one-piece type seal unit composed of the oil seal-integrated rod guide, thereby reducing manufacturing costs.

The depth of the free piston 14 pushed inside the tube 11 may be determined to allow the free piston 14 to be placed below the fluid injection aperture 11d while allowing the upper opening of the tube 11 to be closed by the rod guide 21. Closing the upper opening of the tube 11 by the rod guide 21 is achieved when the rod guide 21 is inserted into the tube 11 so as not to close the fluid injection aperture 11d.

A seal unit inserting apparatus, which descends the seal unit 20 fitted to the piston rod 12 and inserts the seal unit 20 into the upper end of the tube 11, is well known in the art, and a detailed description thereof will thus be omitted herein.

Next, the fluid injection nozzle 110 is sealingly inserted into the fluid injection aperture 11d such that a space between the seal unit 20 and the free piston 14 can be evacuated to a vacuum through the fluid injection aperture 11d. At this time, it can be understood that the space is evacuated by a vacuum pump selectively connected to the fluid injection nozzle 110, as described above.

Next, as shown in FIG. 5, oil is injected into the space between the seal unit 20 and the free piston 14 through the fluid injection aperture 11d via the fluid injection nozzle 110. It can also be understood that the space is filled with the oil at high pressure by an oil supplier selectively connected to the fluid injection nozzle 110, as described above.

Here, since the seal unit 20 is clamped by the supporter, such as the stopper 12a, and the position securing mechanism 120 to be maintained at a certain position, the free piston 14 descends inside the tube 11 as the oil is injected into the tube 11 through the fluid injection aperture 11d. Oil injection may be continued until the internal pressure of the tube 11 reaches a preset value and the free piston 14 reaches a desired position.

In this manner, when oil is injected at high pressure into the space between the seal unit 20 secured to the upper end of the tube 11 and the free piston 14 having gas filled in a gas chamber 11c under the free piston 14, the free piston 14 is pushed down by overcoming pressure by the gas encapsulated in the gas chamber 11c under the free piston 14, so that the free piston 14 can descend to a desired position without being compressed by the piston rod 12.

Therefore, according to the embodiment, since there is no need to deeply insert the piston rod 12 into the tube 11, a wide distance between the upper end of the tube 11 and the upper cap 17 coupled to the upper end of the piston rod 12 may be maintained, thereby providing a sufficient space for operation of the inserting apparatus.

Figure 6:
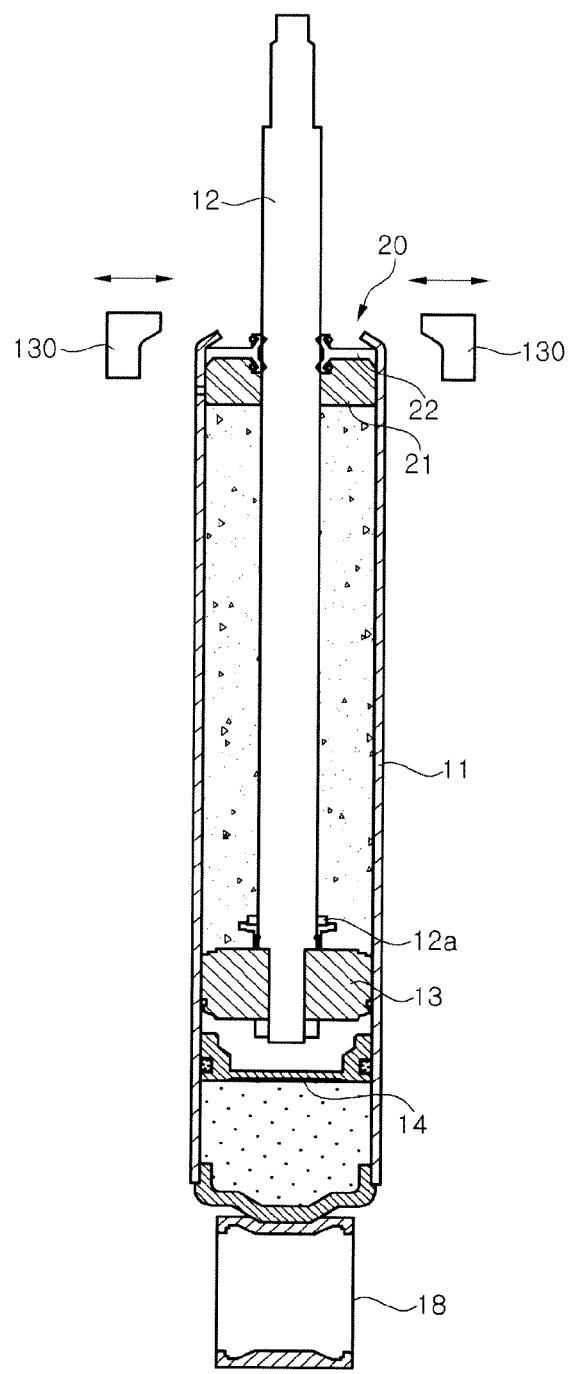

Next, when reaching a desired position, the free piston 14 pushes the seal unit 20 down such that the side surface of the rod guide 21 closes the fluid injection aperture 11d, as shown in FIG. 6.

Then, with the side surface of the rod guide 21 closing the fluid injection aperture 11d, the seal securing mechanism 130 is moved for curling the upper end of the tube 11 protruding above the oil seal 22. As a result, the seal unit 20 may be permanently secured to a certain position while permanently closing the fluid injection aperture 11d without a separate process such as welding or the like. Furthermore, since a post-process such as welding is not performed, there is no need for additional treatment on an outer surface of the tube, thereby reducing manufacturing costs while enhancing productivity.

Obviously, according to the embodiments, the position of the seal unit 20 may be permanently secured by various methods such as curling, caulking, and the like.

Further, the fluid encapsulating apparatus and method according to the embodiments may be applied not to the mono tube-type shock absorber but also to other types of shock absorber such as a twin tube-type shock absorber when filling the shock absorber with a working fluid.

As such, the embodiments of the present disclosure permit the use of not only an oil seal-integrated rod guide but also an oil seal-separated rod guide by pulling a piston rod upwards to secure the rod guide in order to prevent the rod guide from falling down during evacuation after gas injection into the tube.

Furthermore, according to the embodiments, in a final assembly stage of the shock absorber, securing of the rod guide and the oil seal and sealing of the shock absorber can be performed not only by caulking but also by other methods such as curling, without any restriction of the shape of an upper securing part of the shock absorber, such as an eye bolt or other types of bolts.

The various embodiments described above can be combined to provide further embodiments. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for encapsulating fluid in a shock absorber, comprising:
temporarily securing a position of a seal unit by fitting the seal unit into an upper opening of a tube of the shock absorber to seal the upper opening, with the seal unit clamped by a supporter of a piston rod of the shock absorber and a position securing mechanism disposed outside the shock absorber; and
filling the tube with a working oil, wherein
the seal unit is composed of a rod guide and an oil seal separate from each other,
the position securing mechanism temporarily secures a position of the seal unit in cooperation with the supporter, with the piston rod pulled upwards, both the rod guide and the oil seal are vertically clamped together by the supporter and the position securing mechanism so that the rod guide and the oil seal are interposed, and during vertically clamping both the rod guide and the oil seal, the supporter comes into contact with a lower surface of the rod guide to press the rod guide upwardly and the position securing mechanism comes into contact with an upper surface of the oil seal to press the oil seal downwardly.

2. The method of claim 1, further comprising: permanently securing the seal unit after filling the tube with the oil.

3. The method of claim 2, wherein the seal unit is permanently secured by curling.

4. The method of claim 2, wherein the seal unit is permanently secured by caulking.

5. The method of claim 1, further comprising, before filling the tube with the oil:

preparing the tube which has a fluid injection aperture formed at an upper portion thereof to inject gas and oil into the tube and has a closed lower side;

sealing the upper opening of the tube by fitting a free piston into the upper opening; and pushing the free piston into the tube by compressing the piston rod after injecting the gas into the tube through the fluid injection aperture.

6. The method of claim 5, further comprising:

evacuating an internal space of the tube to be filled with the oil to a vacuum before filling the internal space of the tube with the oil, wherein the seal unit is inserted into the upper opening of the tube so as not to close the fluid injection aperture before the tube is filled with the oil, and is further inserted into the upper opening of the tube so as to close the fluid injection aperture after the tube is filled with the oil.

* * * * *